(12) United States Patent
Nams et al.

(10) Patent No.: US 10,479,452 B2
(45) Date of Patent: Nov. 19, 2019

(54) TOW BODY ARRANGEMENT FOR A TOWABLE DEVICE IN A SONAR SYSTEM

(71) Applicant: GeoSpectrum Technologies Inc., Dartmouth (CA)

(72) Inventors: Janis Nams, Dartmouth (CA); Dan Cunningham, Dartmouth (CA); Paul Yeatman, Dartmouth (CA); Bruce A. Armstrong, Dartmouth (CA)

(73) Assignee: GEOSPECTRUM TECHNOLOGIES INC., Dartmouth (CA)

( * ) Notice: Subject to any disclaimer, the term of this patent is extended or adjusted under 35 U.S.C. 154(b) by 0 days.

(21) Appl. No.: 15/757,252

(22) PCT Filed: Sep. 2, 2016

(86) PCT No.: PCT/CA2016/051042
§ 371 (c)(1),
(2) Date: Mar. 2, 2018

(87) PCT Pub. No.: WO2017/035660
PCT Pub. Date: Mar. 9, 2017

(65) Prior Publication Data
US 2018/0290716 A1    Oct. 11, 2018

(30) Foreign Application Priority Data

Sep. 4, 2015 (CA) .................................. 2903227

(51) Int. Cl.
*B63B 21/66*   (2006.01)
*G01V 1/38*    (2006.01)

(52) U.S. Cl.
CPC .......... *B63B 21/663* (2013.01); *G01V 1/3826* (2013.01); *B63B 2211/02* (2013.01); *G01V 2210/1293* (2013.01)

(58) Field of Classification Search
CPC .... B63B 21/663; B63B 2211/02; G01V 1/006
See application file for complete search history.

(56) References Cited

U.S. PATENT DOCUMENTS

| | | | | |
|---|---|---|---|---|
| 4,574,723 | A * | 3/1986 | Chiles ..................... | B63B 21/66 114/253 |
| 4,719,987 | A * | 1/1988 | George, Jr. .......... | G01V 1/3861 181/114 |
| 5,443,027 | A * | 8/1995 | Owsley .................. | B63B 21/66 114/244 |
| 7,983,114 | B2 * | 7/2011 | Ricard .................... | B63B 21/66 367/154 |

(Continued)

FOREIGN PATENT DOCUMENTS

CA   2882225 A1   2/2014

*Primary Examiner* — S. Joseph Morano
*Assistant Examiner* — Jovon E Hayes
(74) *Attorney, Agent, or Firm* — McNees Wallace & Nurick LLC

(57) ABSTRACT

A tow body arrangement for a towable device in a sonar system includes a bridle having a front for connecting to a first tow cable and back for connecting to a second tow cable. The tow body arrangement also includes a tow body rotatably connected to the bridle between the front and back of the bridle. The tow body is shaped to generate hydrodynamic forces tending to rotate the tow body perpendicular to a longitudinal axis of the bridle.

18 Claims, 9 Drawing Sheets

(56) References Cited

U.S. PATENT DOCUMENTS

| | | | | |
|---|---|---|---|---|
| 9,001,623 B1* | 4/2015 | Sharp | ............... | G01S 15/42 |
| | | | | 114/242 |
| 2006/0227658 A1* | 10/2006 | Toennessen | .......... | B63B 21/663 |
| | | | | 367/18 |
| 2017/0203815 A1* | 7/2017 | Dudley | ............... | B63B 21/62 |
| 2018/0290716 A1* | 10/2018 | Nams | ............... | B63B 21/663 |

* cited by examiner

TOW BODY ARRANGEMENT FOR A TOWABLE DEVICE IN A SONAR SYSTEM

RELATED APPLICATIONS

The current applications claims priority under the Paris Convention to Canadian patent application 2,903,227, filed Sep. 4, 2015 and entitled "TOW BODY ARRANGEMENT FOR A TOWABLE DEVICE IN A SONAR SYSTEM," which is incorporated in its entirety herein by reference.

TECHNICAL FIELD

The present invention relates to the field of sonar sensors and in particular to towed, active sonar arrays.

BACKGROUND

A ship can tow a sound-receiving array and a sound-transmitting projector that together form an active sonar system. The sound projector emits pulses of sound that insonify objects. Echoes from the objects are detected by the receive array and, with suitable signal processing, the presence and bearing of objects can be inferred. Active sonar systems designed to detect objects in deep water at long ranges use powerful sound projectors that are frequently deployed separately from the receive array. Such sound projectors are large and heavy. Concomitantly, the deployment and recovery system is large and heavy as is the winch and tow cable. The weight and size of these deep water sonar systems are just barely acceptable for larger ships, but are too great for smaller vessels. In addition to the issues with size and weight, the high power of the acoustic projector in a deep-water sonar system offers few or no advantages in littoral waters having shallower depth. It would, therefore, be desirable to provide an active sonar system that is relatively light and small that could be deployed from a light and small handling system.

SUMMARY

In accordance with the present disclosure, there is provided a towable device for towing behind a watercraft comprising: a bridle having a front for connecting to a first tow cable and back for connecting to a second tow cable; a tow body rotatably coupled to the bridle between the front and back of the bridle, the tow body rotatable relative to the bridle between a storage position and an approximately vertical position in use.

In a further embodiment of the towable device, the tow body has an oblong shape and is rotatable about an axis perpendicular to a longitudinal axis of the tow body.

In a further embodiment of the towable device, the bridle is winched in-line with the first and second tow cables.

In a further embodiment of the towable device, the bridle is winched along with the first and second tow cables.

In a further embodiment of the towable device, the tow body comprises a sound projector.

In a further embodiment of the towable device, the tow body comprises a downward lift surface for generating a downward hydrodynamic force when being towed to rotate the tow body into the approximately vertical position.

In a further embodiment of the towable device, the tow body is weighted to provide a rotational force to the tow body in order to cause the tow body to rotate into the approximately vertical position.

In a further embodiment, the towable device further comprises an electronically controlled actuator for rotating the tow body into the approximately vertical position.

In a further embodiment of the towable device, the tow body is rotatably connected to a support frame mounted to the bridle.

In a further embodiment of the towable device, the bridle is flexible along its longitudinal axis.

In a further embodiment of the towable device, the bridle comprises a pair of yokes joined by a pair of flexible arms.

In a further embodiment of the towable device, the flexible arms comprise a plurality of rigid members pivotally connected together.

In a further embodiment of the towable device, the tow body is releasably connected to the bridle.

In a further embodiment of the towable device, when towed in submersion, the tow body assumes a stable vertical equilibrium position due to a weight and buoyancy distribution of the tow body, distribution of hydrodynamic drag and lift forces acting on the body, and location of a tow point at the front of the bridle where a towing force is applied to the towable device.

In a further embodiment of the towable device, in the absence of the hydrodynamic forces the tow body can freely rotate relative to the bridle.

BRIEF DESCRIPTION OF THE DRAWINGS

Features, aspects and advantages of the present disclosure will become better understood with regard to the following description and accompanying drawings in which.

DETAILED DESCRIPTION

Figure 1:
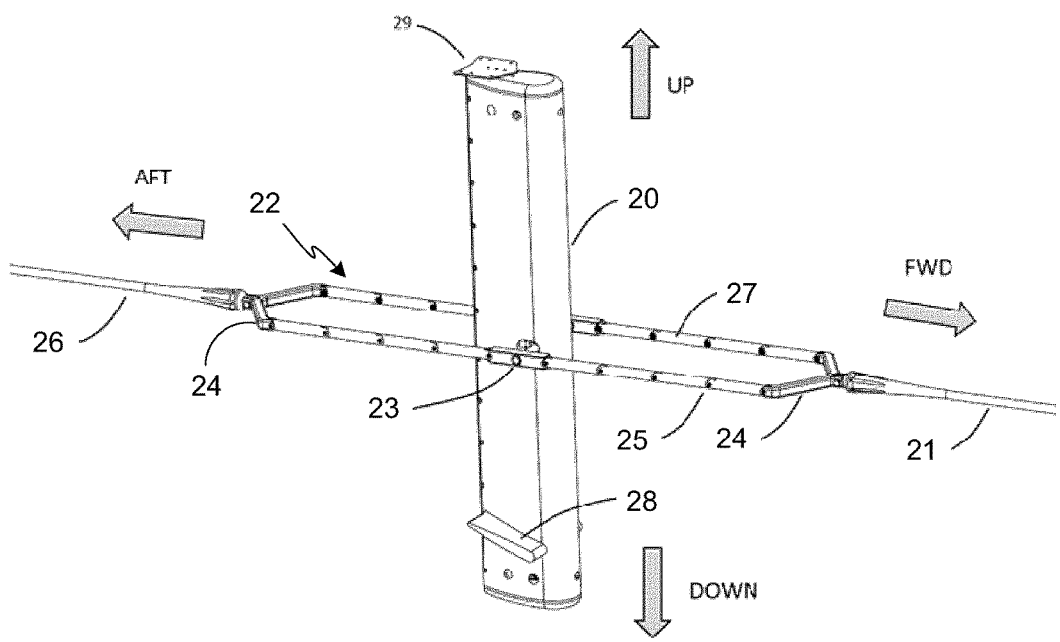
FIG. 1 depicts a representation of invention in one embodiment as a vertical acoustic projector towed inline between a tow cable and receive array.

A towable device for a towed sonar array is described in further detail below. The towable device provides a towed sonar array that may be deployed from a relatively small and light handling system, such as from a winch that stores a tow cable. Such a towable sonar array system is possible if the sound projector and receive array are more or less co-axially aligned during storage, deployment and recovery. As described further below, a towable device includes a bridle that is connected to a tow cable and has a tow body that can house the sound projector rotatably mounted to the bridle, in order to allow the sound projector to rotate to a position providing desired sonar performance as well as a storage position to provide easy deployment, recovery and storage.

An ideal acoustic beam pattern from the sound projector is omnidirectional in a plane approximately parallel to the water surface. It is desirable that as little of the acoustic power as possible is radiated vertically towards the ocean surface and bottom, which increases the reverberation, or background noise, but does not illuminate a target with acoustic energy. Thus, acoustic energy transmitted in a vertical direction degrades detection performance. To produce a desired beam pattern, a sound projector may be used whose length is similar to or greater than the wavelength of the sound being produced, but whose width and depth are small compared to the wavelength. Further, to provide the desired acoustic beam pattern it is desirable that the long axis of the sound projector is oriented vertically, i.e., pointing towards the ocean bottom and surface. A receive array capable of detecting the sound produced by the sound projector is towed horizontally through the water behind the sound projector. In use, the long axis of the sound projector must be oriented at right angles to the receive array. This orientation arranges the sound projector and sound receiver at right angles to each other, as opposed to a co-axial orientation that facilitates storage, recovery and deployment.

The towable device describe herein can be used to provide an active sonar system that has a sound projector capable of producing favourable beam patterns, while still being easy to deploy, recover and store. The towable device comprises a bridle that has a front connected to a tow cable attached to a towing vessel and a back that is connected to a second tow cable that can tow a sonar receiver. A tow body may be rotatably mounted within the bridle and may carrier a sonar transducer. The bridle and rotatably connected to the tow body allows the towable device to be located in-line with the tow cable and so allows the device to winched along with the tow cable providing for simply deployment, recovery and storage. The simple deployment, recovery, and storage of the towable device provides a towable active sonar system that is suitable for use on small, possibly unmanned, vessels. The towable device provides an acoustic projector that can be handled, towed, and stored using the same winch as the receive array, eliminating the need for separate deck equipment for handling the active and passive components of the system. The towable device allows the sound projector to be aligned largely co-axially aligned with the receive array during storage, deployment and recovery from a small winch, and to be aligned vertically, and perpendicular to the receive array, during use thereby producing favourable beam patterns. The change of orientation when in use and in storage may be accomplished without the intervention of deck personnel, which provides an easily deployed, retrieved and stored sonar system.

The towable device described in the present disclosure allows an oblong body carrying a sound projector to be towed behind a watercraft with the oblong body, and so the sound projector, in a stable vertical position. With the oblong body in an approximately vertical position, the towable device is provide a desirable orientation of the sound projector without requiring large and heavy handling and storage equipment typically associated with such a towed system. When integrated with a receive array, the towed body forms an active sonar system.

According to an illustrative embodiment, in relation to a vertical acoustic projector array, an oblong body may carry a projector array, the axis of which is parallel with the longitudinal axis of the oblong tow body. The tow body may be a rigid body for carrying or supporting the sound projector array and may be rotatably coupled to a tow bridle that is towed behind the watercraft. The rigid tow body may be pivotaly connected to the bridle, either directly or through a support frame. The bridle may provide a flexible structure that allows the towable device to be towed behind the watercraft which is towed inline between a tow cable and passive receive array. The tow body is able to pivot freely within the bridle when it is out of the water, in the absence of the hydrodynamic forces generated by the tow body when travelling through the water. This allows the body to rotate to a position where its long axis is parallel to a tow cable axis during recovery, which makes the axial cross section of the assembly small and streamlined, to be able to fit through small openings in a tow vessel. Although described as rotating into an approximately vertical position under the hydrodynamic forces generated during towing, it is possible for the tow body to be rotated by an actuator, such as a motor, that may be electronically controlled. Additionally, the towable device may include a locking mechanism in order to lock the tow body in the approximately vertical position. The locking mechanism may be a mechanical lock and/or an electronically controlled lock.

The tow body may be coupled to the bridle via a pivoting axle located at the longitudinal center of drag of the tow body. The hydrodynamic drag balance about the axle provides the tow body a stable equilibrium position where its long axis may be perpendicular to its velocity through the water, which provides the tow body with pitch stability. The pivot axle may be offset from the crosswise centerline of the tow body, toward one of the long edges, designated as the forward edge. The opposite edge may be referred to as the aft edge. This offset may be sufficient so that the crosswise center of drag is located aft of the axle. This allows the net aft force on the tow body (i.e. drag) to be centered behind the net forward force (i.e. tow tension at the axle) which gives the tow body yaw stability. The center of weight of the tow body may be offset from the axle location, toward one end of the body, which may be designated as the bottom end. The center of buoyancy of the tow body may be located above the center of weight, giving the body an upright equilibrium orientation. The tow body may integrate a downward angled lift surface, or depressor, which may be located below the axle. When the lift surfaces are present, the downward force, located below the tow point, may provide additional roll stability, and may also provide depth keeping force for the tow body, without the need for an external depressor. This lift surface, when present, may be passive, or actively controlled. Additional lift surfaces may be incorporated into the shape of the tow body to achieve even deeper tow depths without requiring extra equipment.

According to an embodiment, the tow body may be reeled directly onto, and stored on, the winch drum within the bridle, which may bend to match the curved drum surface. According to another embodiment, the tow body and bridle may be stored on the winch, in a separate compartment. According to another embodiment, the tow body may be attached to the bridle with a quick-connect device, allowing the tow body to be removed from the bridle during recovery and stored separately from the winch.

FIG. 1 shows a towable device in an upright equilibrium position while towed under water. The towable device 1 comprises a rigid tow body 20 that may carry a sound projector. The tow body 20 may be rotatably mounted within a bridle 22. The bridle 22 may be connected to a tow cable 21 at its forward end and to a cable 26 connected to a receiver array (not shown) at its aft end. The tow body 20 may be a discrete structure, separate from the tow cable 21 and bridle 22. The tow body 20 may be mechanically coupled to the bridle by a pivot connection 23, which is oriented horizontal and perpendicular to the bridle's and tow body's longitudinal axis. Electrical connections to the tow body, or more particularly the sound projector, may be made through the pivot connection itself or through a separate cable. Further, the tow body 20 may be pivotally connected directly to the bridle 22 or may be pivotally connected to another support structure that is in turn coupled to the bridle. The further support structure may house electronics and other components, such as a rotational actuator and/or locking mechanisms and other electronic sensors.

The bridle 22 is depicted as being composed of two rigid yokes 24 and two flexible arms 25 connected between each of the yoke arms. The two rigid yokes 24 are disposed along the longitudinal axis of the bridle. The yokes 24 maintain the spacing between the flexible arms 25 and also interface to the tow cable and receiver array 26. The flexible arms 25 may be formed from flexible members or may be formed of numerous individual rigid elements 27 coupled end-to-end with pivoting joints. The flexible arms 25 may flex or bend such that they can articulate relative to each other. Alternatively, the bridle arms may be formed from a single, flexible element each, or of some other mechanism allowing limited flexure. The bridle may carry the tension both of drag on the tow body and of drag on the receiver array that is towed behind it. Electrical and/or fiber optic connections to a passive array, such as a receiver array, towed behind the body are routed through one or both of the bridle arms.

During submerged towing, drag acting on the tow body 20 and passive array or other towed elements behind it may maintain the bridle in a stretched-out, approximately horizontal shape. It should be noted however that the horizontal shape the bridle holds, and the towed passive array's effects on it, do not significantly impact the orientation or stability of the tow body. Further, although described as a flexible bridle, the flexibility is provided in order to allow the bridle to conform to the drum of a winch while also providing a relatively flat shape to facility deployment and recovery. It is possible to provide a relatively rigid bridle that is curved to conform to the drum of the winch, or that is relatively flat however, depending upon the size of the bridle and drum, a rigid and flat bridle may storing the towable device on the drum more difficult or cumbersome.

The tow body may incorporates a downward inclined lift surface, or depressor 28, below the pivotal connection when oriented in the approximately vertical position. This depressor may simultaneously stabilizes and body in roll and pitch. Further, the depressor 28 may drive the towable device to greater tow depth than would otherwise be achieved, which is generally desirable from an acoustic perspective. Other lift surfaces may be incorporated into the tow body, or the bridle, to provide greater tow depth. External stability surfaces 29 may be added to the tow body. These could take the form of horizontal or vertical fins, or some other configuration as required.

Figure 2:
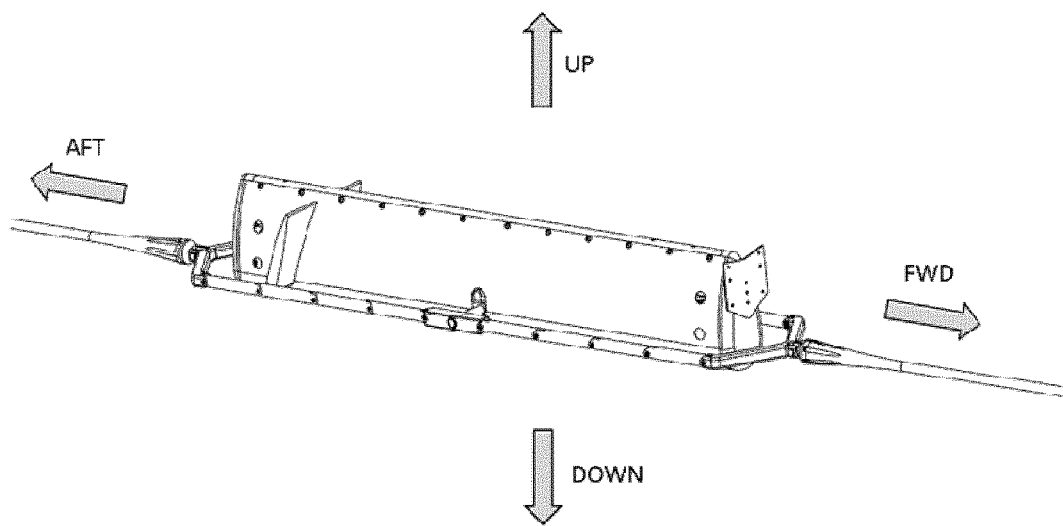
FIG. 2 depicts a representation of the device with the tow body rotated about its axle to a parallel position with respect to the tow cable axis.

FIG. 2 shows the tow body rotated about its pivotal connection into a storage position that is approximately horizontal or parallel to the bridle. In the storage position, the tow body may at least partially nest inside the bridle providing the towable device with a small end-on profile that can make deployment and recovery easier.

Figure 3:
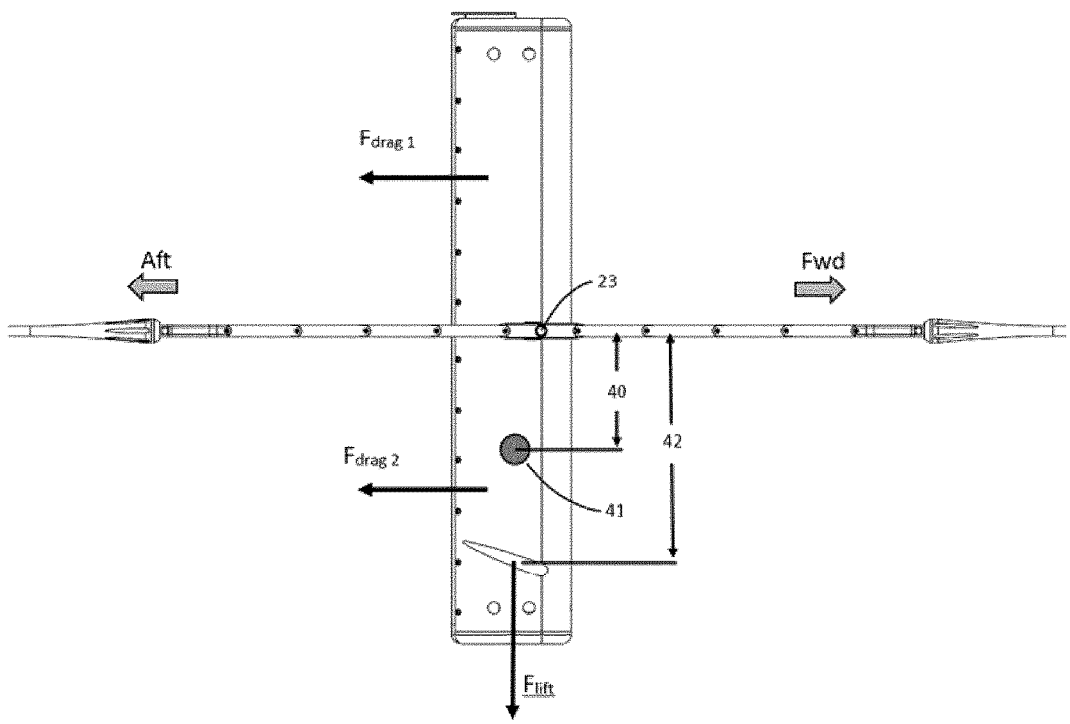
FIGS. 3 to 5 depict representations of stability forces acting on the body under tow.

FIG. 3 illustrates the pitch stability characteristics of the towable device. The pivot forms the tow body's pitch axis. It should be noted that the horizontal orientation seen in FIG. 2 is not an equilibrium position. The tow body is free to be rotated about the pitch axis, but once the input is removed the tow body will tend to rotate back toward the vertical orientation, due to its center of weight 41 being offset 40 below the pivot 23. The righting force due to this weight offset is small, however, relative to the righting force due to the hydrodynamic drag balance $F_{drag1}=F_{drag2}$ about the pivot, which is experienced while towing. Furthermore, if a depressor is provided, the depressor lift force $F_{lift}$, offset 42 below the pivot, may provide yet another hydrodynamic righting force, preventing imperfections in the drag balance from impacting overall pitch stability.

Figure 4:
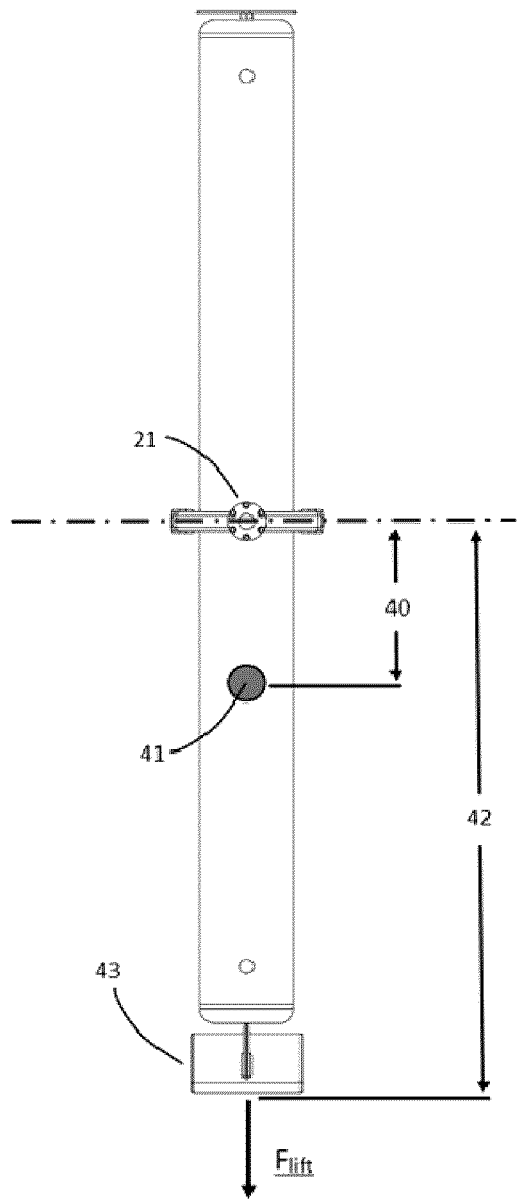

FIG. 4 illustrates the roll stability characteristics of the towable device. The tow cable 21, which is centered on the pivoting axle, forms the roll axis of the body. Similarly to in pitch, the offset center of weight gives a restoring force to hold the body vertical in roll, both in and out of the water. When submerged and towing, if a depressor is provided as depicted in FIG. 4, the hydrodynamic depressor lift force $F_{lift}$ may provide a larger restoring force and may provide roll stability while underway. The depressor, when present, may take any suitable form. The depressor 43 shown in FIG. 4 is mounted to one end of the body, as opposed to being integrated into the body casing as shown in previous figures. Possible depressor configurations include but are not limited to: passive or actively controlled, flat or V-wing shaped, fixed or pivoting. Further, the depressor may be omitted.

Figure 5:
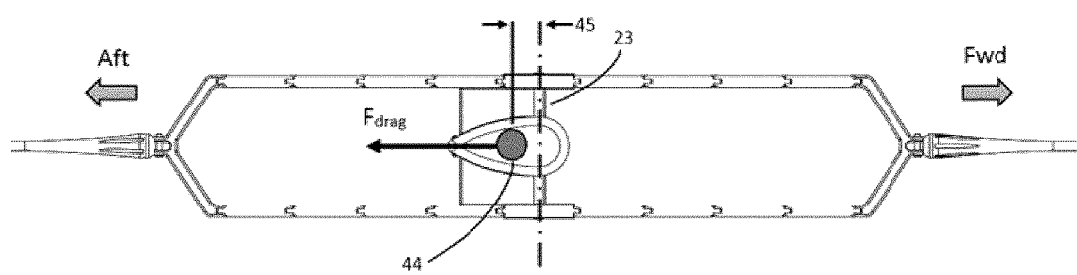

FIG. 5 illustrates the yaw stability characteristics of the towable device. The body is towed by its axle 23, which is offset 45 forward of the body's forward-aft center of drag 44. Force $F_{drag}$, acting in the aft direction and centered aft of the net forward force (located at the pivot) creates a restoring moment in the horizontal plane, and giving the tow body inherent yaw stability.

Stability of the towable device may be achieved using hydrodynamic force as a primary restoring mechanism. Certain forces which cause instability are hydrodynamic, and therefore speed dependent, in nature. Towable devices which rely primarily on speed-independent restoring forces for stability (deadweight, for example), are subject to instability at high speeds, because the stabilizing force does not increase in magnitude to match the destabilizing forces. The towable device may use hydrodynamic lift, as opposed to deadweight, to achieve depth. This may provide the towable device a stable towing depth capacity, as the downward force generated increases in proportion with increased drag, which would otherwise make the system tow shallower at higher speeds.

Figure 6:
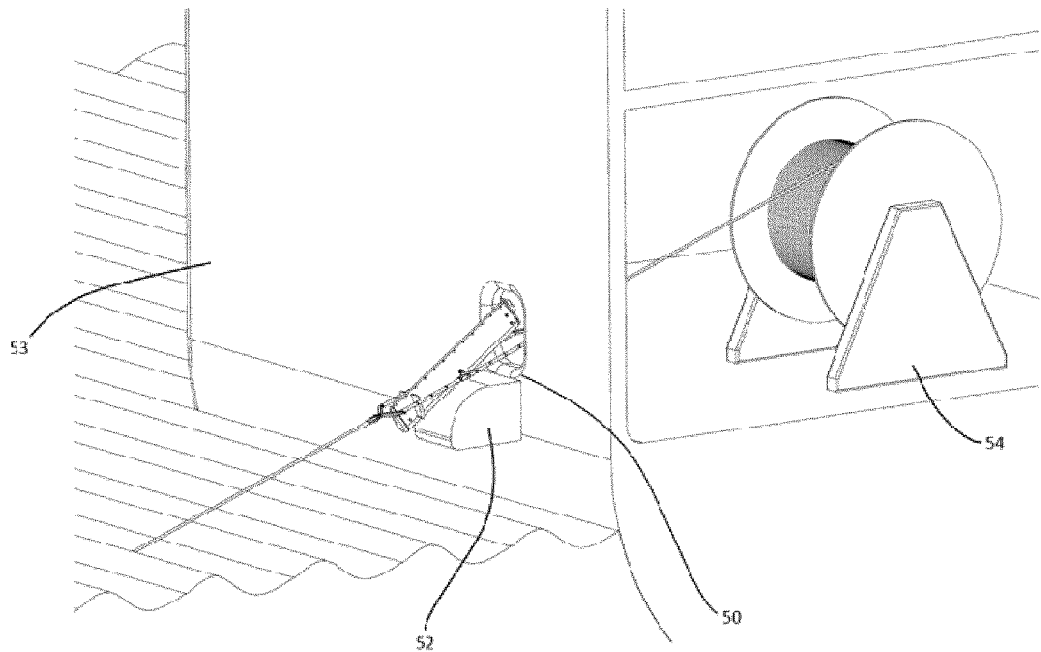
FIG. 6 depicts a representation of the device passing through small opening in tow vessel during recovery to an enclosed handling deck.
Figure 7:
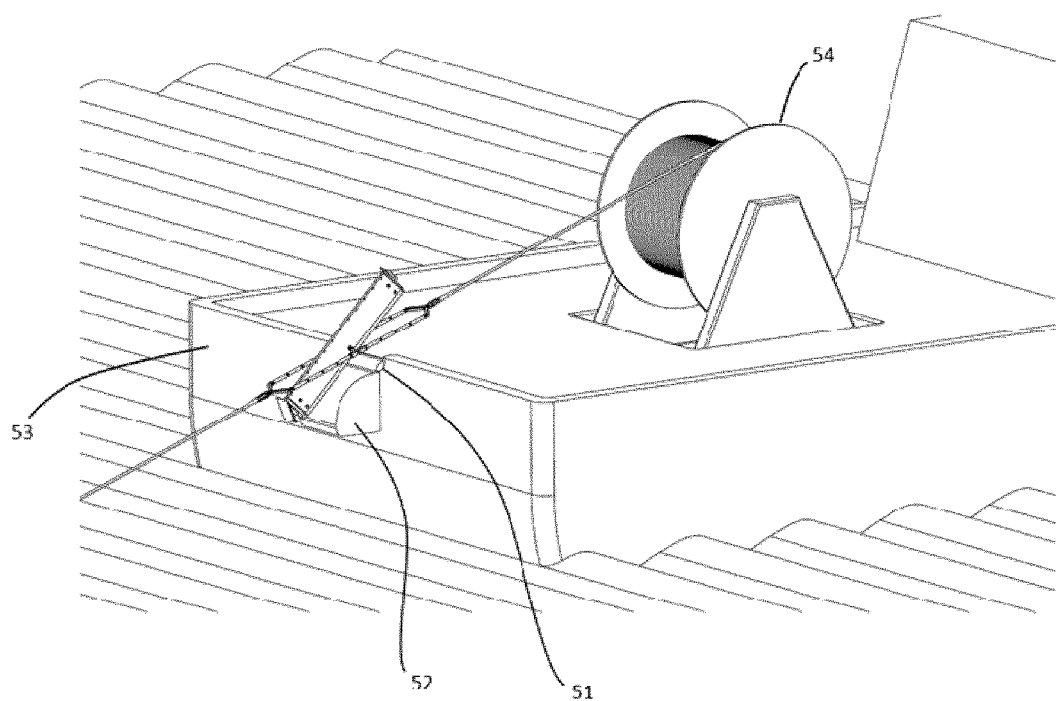
FIG. 7 depicts a representation of the device passing over the gunwale of tow vessel during recovery to an open handling deck.

FIG. 6 depicts a representation of the device passing through small opening in tow vessel during recovery to an enclosed handling deck. FIG. 7 depicts a representation of the device passing over the gunwale of tow vessel during recovery to an open handling deck. The free rotation of the tow body in the pitch axis allows it to be rotated to the horizontal position, in order to reduce the overall cross section of the system to fit through small openings 50, or over obstacles 51, during deployment and recovery. Any of various means may be used to rotate the body horizontal. In the embodiment pictured in FIG. 6, a protruding boss 52 below the retrieval opening 50, 51 on the stern of the tow vessel 53 contacts the lower end of the tow body as a retrieval winch 54 reels in the towed system. The tow body naturally pivots up and over the boss, as it comes into contact, bringing it horizontal without further operator input. Additionally or alternatively, the tow body may be brought to the horizontal position by other means including weight distribution, acceleration, locks, and/or powered actuators.

The device's ability to rotate out of the way allows the complete tow cable/body/array system can be deployed and recovered in a similar way to how a simple array would be handled, without the large and complex handling equipment typically needed for an active tow body.

Figure 8:
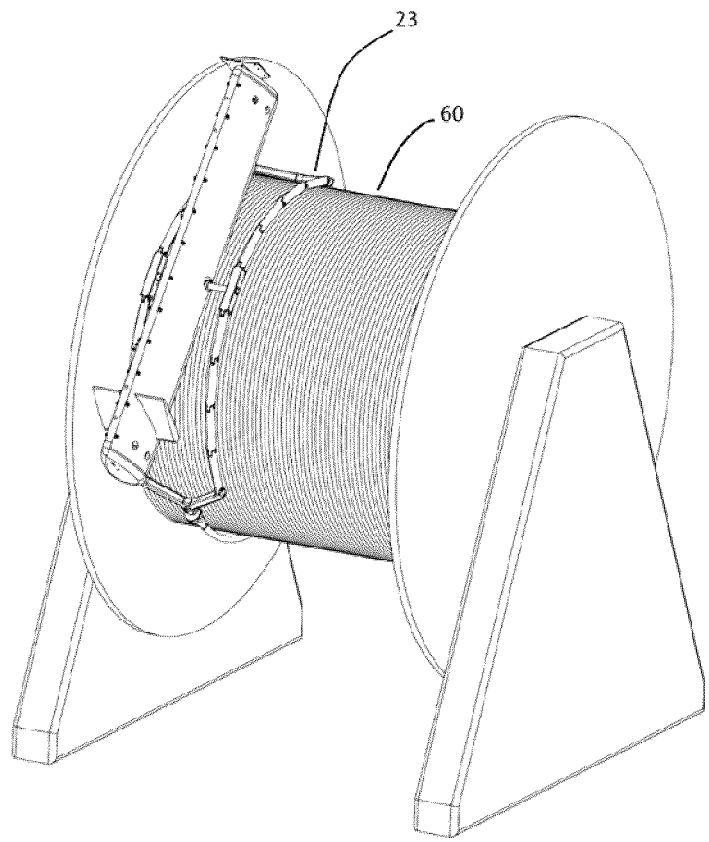
FIGS. 8 and 9 depict representations of the device stored on a winch in different configurations.
Figure 9:
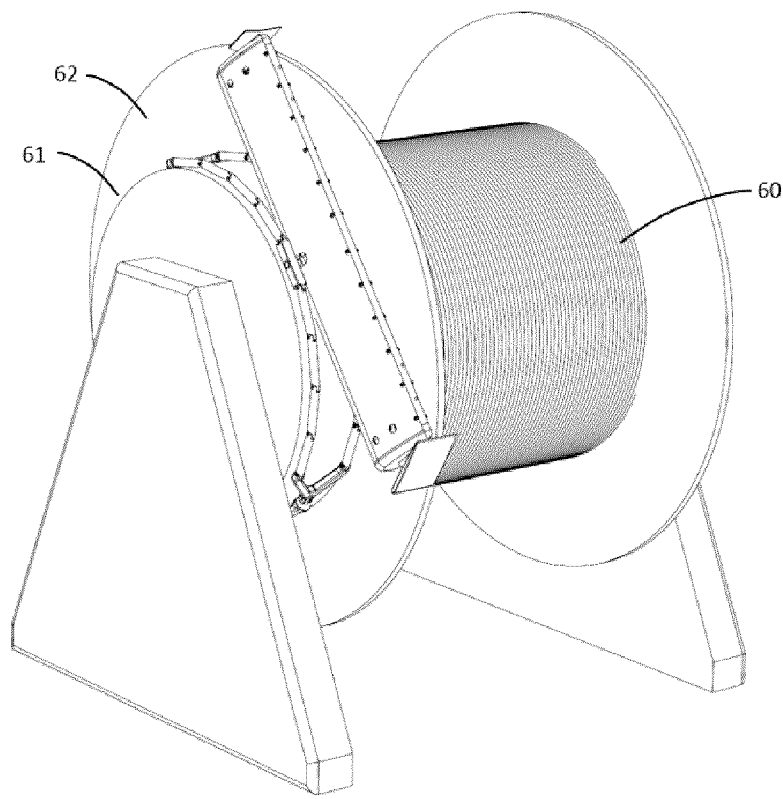

FIGS. 8 and 9 depict representations of the device stored on a winch in different configurations. The towable device can be stored in a number of possible ways onboard a tow vessel. The flexible bridle 22 can curve to conform over a round winch drum, allowing the tow body to be stored directly on the same winch as the rest of the system, wound on top of the tow cable 60 already on the drum. All tension is carried by the bridle, as opposed to the tow body, so there is no bending force on the tow body as would normally be present if a rigid structure were reeled on a winch drum. Similarly, the tow body can be stored on the same winch as the rest of the system, but on a separate compartment 61 of the winch, separated from the tow cable 60 by a dividing flange 62. This arrangement may be beneficial if it is undesirable to wind the tow body on top of the tow cable.

In further embodiment, the tow body could be secured to the bridle with a quick-disconnect mechanism, and the tow body disconnected before reeling the bridle on the winch, and stored separately.

The details of these handling and storage scenarios do not define or limit the scope of the invention, but rather serve to demonstrate its use and possible benefits, in terms of the limited deck space and handling equipment which suffice for its deployment and recovery.

Various specific details have been described above. While certain features or functionality may be described in particular detail with regard to one device or component, it will be appreciated that the functionality or features may be applied to other devices or components. Further, although various embodiments of the devices, equipment, functionality, etc. are described herein, the description is intended to provide an understanding of the systems, methods and devices and as such certain aspects may not be described, or not described in as much detail as other aspects. The described systems and devices are not the sole possible implementations, and the various descriptions systems and devices herein will enable one of ordinary skill in the art to apply the teachings to other equivalent implementations without exercising any inventive ingenuity.

What is claimed is:

1. A towable device for towing behind a watercraft comprising:
    a bridle having a front for connecting to a first tow cable and back for connecting to a second tow cable;
    a tow body rotatably coupled to the bridle at a single pivot connection between the front and back of the bridle, the tow body rotatable about the single pivot point relative to the bridle between a recovery position in line with the front of the bridle and the back of the bridle and an approximately vertical position in use.

2. The towable device of claim 1, wherein the tow body has an oblong shape and is rotatable about an axis perpendicular to a longitudinal axis of the tow body.

3. The towable device of claim 1, wherein the bridle is winched in-line with the first and second tow cables.

4. The towable device of claim 1, wherein the bridle is winched along with the first and second tow cables.

5. The towable device of claim 1, wherein the tow body comprises a sound projector.

6. The towable device of claim 1, wherein the tow body comprises a downward lift surface for generating a downward hydrodynamic force when being towed to rotate the tow body into the approximately vertical position.

7. The towable device of claim 1, wherein the tow body is weighted to provide a rotational force to the tow body in order to cause the tow body to rotate into the approximately vertical position.

8. The towable device of claim 1, further comprising an electronically controlled actuator for rotating the tow body into the approximately vertical position.

9. The towable device of claim 1, wherein the tow body is rotatably connected to a support frame mounted to the bridle.

10. The towable device of claim 1, wherein the bridle is flexible along its longitudinal axis.

11. The towable device of claim 1, wherein the bridle comprises a pair of yokes joined by a pair of flexible arms.

12. The towable device of claim 11, wherein the flexible arms comprise a plurality of rigid members pivotally connected together.

13. The towable device of claim 1, wherein the tow body is releasably connected to the bridle.

14. The towable device of claim 1, wherein when towed in submersion, the tow body assumes a stable vertical equilibrium position due to a weight and buoyancy distribution of the tow body, distribution of hydrodynamic drag and lift forces acting on the body, and location of a tow point at the front of the bridle where a towing force is applied to the towable device.

15. The towable device of claim 1, wherein in the absence of the hydrodynamic forces the tow body can freely rotate relative to the bridle.

16. The towable device of claim 1, wherein the tow body is a rigid tow body.

17. A towable device for towing behind a watercraft comprising: a bridle having a front for connecting to a first tow cable and back for connecting to a second tow cable;
    a rigid tow body rotatably coupled to the bridle between the front and back of the bridle, the rigid tow body rotatable relative to the bridle between a recovery position and an approximately vertical position in use; and further comprising an electronically controlled actuator for rotating the rigid tow body into the approximately vertical position.

18. A towable device for towing behind a watercraft comprising:
    a bridle having a front for connecting to a first tow cable and back for connecting to a second tow cable;
    a tow body rotatably coupled to the bridle between the front and back of the bridle, the tow body rotatable relative to the bridle between a recovery position and an approximately vertical position in use; and
    an electronically controlled actuator for rotating the tow body into the approximately vertical position.

* * * * *